US011870155B2

(12) United States Patent
Zhang et al.

(10) Patent No.: US 11,870,155 B2
(45) Date of Patent: Jan. 9, 2024

(54) CALIBRATION DEVICE, BASE STATION ANTENNA AND A COMMUNICATION ASSEMBLY

(71) Applicant: CommScope Technologies LLC, Hickory, NC (US)

(72) Inventors: Xun Zhang, Suzhou (CN); Hangsheng Wen, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 309 days.

(21) Appl. No.: 17/237,255

(22) Filed: Apr. 22, 2021

(65) Prior Publication Data

US 2021/0376454 A1 Dec. 2, 2021

(30) Foreign Application Priority Data

May 28, 2020 (CN) ......................... 202010466000.6

(51) Int. Cl.
*H01Q 3/26* (2006.01)

(52) U.S. Cl.
CPC .................................. *H01Q 3/267* (2013.01)

(58) Field of Classification Search
CPC .............................. H01Q 3/267; H01Q 1/246
See application file for complete search history.

(56) References Cited

U.S. PATENT DOCUMENTS

| | | | | |
|---|---|---|---|---|
| 6,377,217 B1 * | 4/2002 | Zhu | H01P 1/181 343/771 |
| 2014/0184457 A1 * | 7/2014 | Lea | H01Q 21/0075 343/747 |
| 2017/0170549 A1 * | 6/2017 | Buondelmonte | H01Q 21/0075 |

FOREIGN PATENT DOCUMENTS

| | | |
|---|---|---|
| CN | 102055506 A | 5/2011 |
| CN | 107342827 A | 11/2017 |
| WO | 2019209903 A1 | 10/2019 |

OTHER PUBLICATIONS

"European Search Report corresponding to European Application No. 21172296.2, dated Oct. 18, 2021, 14 pages".

* cited by examiner

*Primary Examiner* — Daniel Munoz
(74) *Attorney, Agent, or Firm* — Myers Bigel, P.A.

(57) ABSTRACT

A calibration device for an antenna includes a dielectric substrate and a metal pattern printed on the dielectric substrate. The metal pattern includes at least a portion of a calibration circuit, where a first portion of the calibration circuit is on a first major surface of the dielectric substrate, a second portion of the calibration circuit is on an opposed second major surface of the dielectric substrate. The first portion and/or the second portion of the calibration circuit may be constructed as coplanar waveguide transmission lines.

19 Claims, 6 Drawing Sheets

CALIBRATION DEVICE, BASE STATION ANTENNA AND A COMMUNICATION ASSEMBLY

CROSS-REFERENCE TO RELATED APPLICATION

The present application claims priority to Chinese Patent Application No. 202010466000.6, filed May 28, 2020, the entire content of which is incorporated herein by reference as if set forth fully herein.

FIELD

The present invention generally relates to radio communications and, more particularly, to a calibration device, a base station antenna and a communication assembly.

BACKGROUND

Cellular communications systems are well known in the art. In a cellular communications system, a geographic area is divided into a series of regions that are referred to as “cells” which are served by respective base stations. Each base station may include one or more base station antennas that are configured to provide two-way radio frequency (“RF”) communications with mobile subscribers that are within the cell served by the base station.

In many cases, each base station is divided into “sectors”. In perhaps the most common configuration, a hexagonally shaped cell is divided into three 120° sectors, and each sector is served by one or more base station antennas that have an azimuth Half Power Beam width (HPBW) of approximately 65°. Typically, the base station antennas are mounted on a tower structure, with the radiation patterns (also referred to herein as “antenna beams”) that are generated by the base station antennas directed outwardly. Base station antennas are often implemented as linear or planar phased arrays of radiating elements.

Due to the growing demand for wireless communications, multi-band technology, Multiple-Input Multiple-Output (MIMO) technology, and beamforming technology have been rapidly developed to support different services and high throughput data transmission. However, with the integration of more and more frequency bands and/or RF ports in one base station antenna, the antenna system such as the feed network and the calibration network become more complicated and more sensitive to interference. Therefore, how to achieve high anti-interference performance of the antenna system at reasonable cost has been a technical problem urgently to be solved by those skilled in the art.

SUMMARY

According to a first aspect of the present invention, there is a calibration device for an antenna provided. The calibration device comprises a dielectric substrate and a metal pattern printed on the dielectric substrate, wherein the metal pattern includes at least a portion of a calibration circuit, wherein a first portion of the calibration circuit is provided on a first major surface of the dielectric substrate, a second portion of the calibration circuit is provided on a second major surface of the dielectric substrate opposite the first major surface, and the first portion and/or the second portion of the calibration circuit are/is constructed as coplanar waveguide transmission lines. Therefore, a high anti-interference performance of the antenna system can be achieved at reasonable cost.

In some embodiments, the first portion of the calibration circuit at least includes a radio frequency (RF) port and/or a coupler.

In some embodiments, the second portion of the calibration circuit at least includes a calibration port and/or a power combiner.

In some embodiments, the first portion of the calibration circuit comprises a plurality of first conductive traces and the second portion of the calibration circuit comprises a plurality of second conductive traces, and the metal pattern further includes a first coplanar ground area printed on both sides of at least some of the first conductive traces and a second coplanar ground area printed on both sides of at least some of the second conductive traces.

In some embodiments, the first coplanar ground area is spaced apart from the first conductive traces by a first slot, in which metallization is removed, and the second coplanar ground area is spaced apart from the second conductive traces by a second slot, in which metallization is removed.

In some embodiments, with reference to a direction perpendicular to the first major surface of the dielectric substrate, the first portion of the calibration circuit is directly above at least a portion of the second coplanar ground area, and/or the second portion of the calibration circuit is directly below at least a portion of the first coplanar ground area.

In some embodiments, the first portion of the calibration circuit and/or the second portion of the calibration circuit are/is at least partially configured as coplanar waveguide transmission lines with back metallization.

In some embodiments, the first slot has a width between 0.1 mm and 1 mm, and the second slot has a width between 0.1 mm and 1 mm.

In some embodiments, the first portion of the calibration circuit is electrically connected to the second portion of the calibration circuit by means of a first conductive structure.

In some embodiments, the first conductive structure includes a via or a metal conductor.

In some embodiments, the first coplanar ground area is electrically connected to the second coplanar ground area by means of a second conductive structure.

In some embodiments, the second conductive structure includes a via or a metal conductor.

According to a second aspect of the present invention, there is a base station antenna provided. The base station antenna comprises a reflector, a calibration device and a baseplate, wherein an antenna array is provided on the front side of the reflector, the calibration device and the baseplate are provided on the rear side of the reflector, and the calibration device is mounted on the baseplate, wherein the calibration device includes a dielectric substrate and a metal pattern printed on the dielectric substrate, wherein the metal pattern includes at least a portion of a calibration circuit, wherein a first portion of the calibration circuit is provided on a first major surface of the dielectric substrate and a second portion of the calibration circuit is provided on a second major surface of the dielectric substrate opposite the first major surface, and the first portion of the calibration circuit includes a radio frequency (RF) port and a coupler.

In some embodiments, the second portion of the calibration circuit includes a calibration port and/or a power combiner.

In some embodiments, the first portion of the calibration circuit is electrically connected to the second portion of the calibration circuit by means of a first conductive structure.

In some embodiments, an output end of the coupler in the first portion of the calibration circuit is electrically connected with an input end of the power combiner in the second portion of the calibration circuit by means of the first conductive structure.

In some embodiments, the baseplate is provided with a groove, in which metal is removed, wherein the first portion of the calibration circuit falls within the range of the groove to avoid direct electrical contact between the first portion of the calibration circuit and the baseplate.

In some embodiments, the first portion and the second portion of the calibration circuit are configured as coplanar waveguide transmission lines.

In some embodiments, the first portion of the calibration circuit comprises a plurality of first conductive traces and the second portion of the calibration circuit comprises a plurality of second conductive traces, and the metal pattern further includes a first coplanar ground area printed on both sides of at least some of the first conductive traces, and a second coplanar ground area printed on both sides of at least some of the second conductive traces.

In some embodiments, the first coplanar ground area is spaced apart from the first conductive traces by a first slot, in which metallization is removed, and the second coplanar ground area is spaced apart from the second conductive traces by a second slot, in which metallization is removed.

In some embodiments, the first portion of the calibration circuit and/or the second portion of the calibration circuit are/is at least partially configured as coplanar waveguide transmission lines with back metallization.

In some embodiments, the first coplanar ground area is electrically connected to the second coplanar ground area by means of a second conductive structure.

In some embodiments, the calibration device is configured as a single-layer printed circuit board including only one dielectric substrate between the first portion and the second portion of the calibration circuit.

According to a third aspect of the present invention, there is a communication assembly provided. The communication assembly comprises a RF unit and a base station antenna according to one of the embodiments of present invention, wherein the baseplate is provided on a front side of the calibration device, and the RF unit is provided on a rear side of the calibration device, so that the first major surface of the dielectric substrate of the calibration device is faced away from the RF unit.

In some embodiments, the RF unit and the calibration device bi-directionally transmit RF signals by means of a coaxial connection device.

In some embodiments, a filter is mounted between the calibration device and the RF unit.

DETAILED DESCRIPTION

Figure 1:
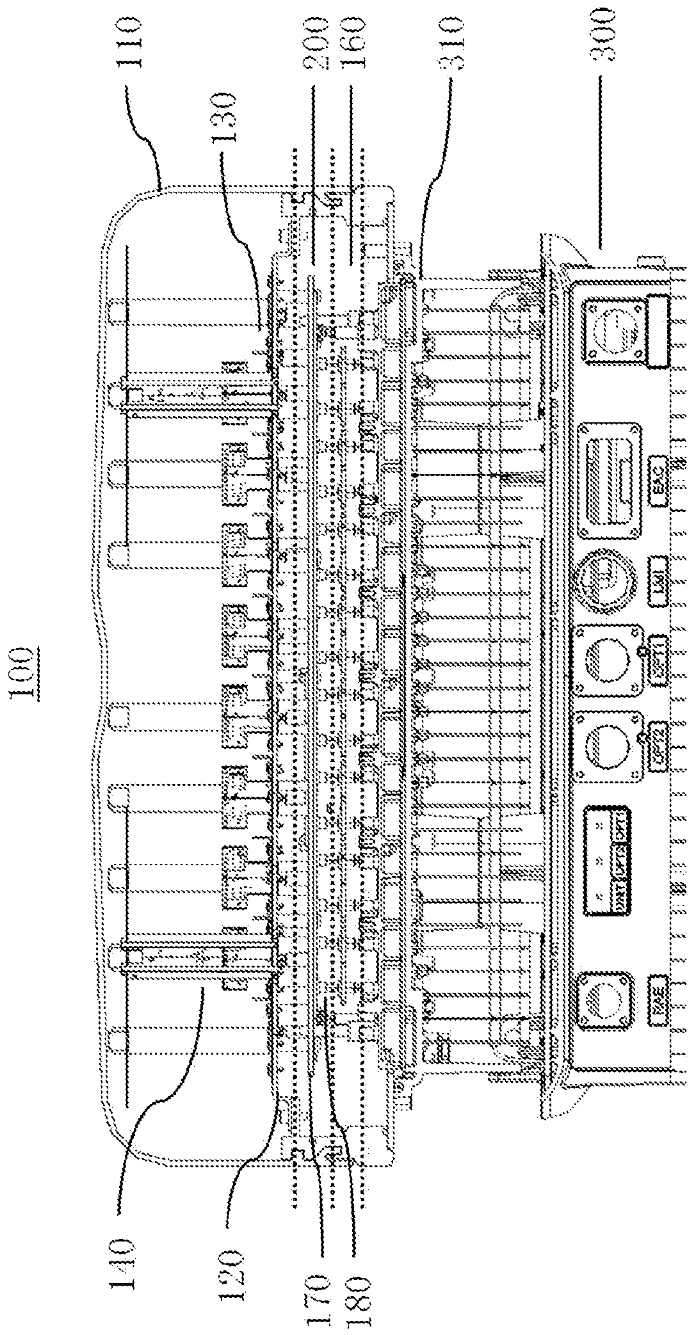
FIG. 1 is a schematic top view showing a communication assembly according to some embodiments of the present invention, the communication assembly including a base station antenna according to some embodiments of the present invention and an integrated RRU.

The present invention will be described below with reference to the drawings, in which several embodiments of the present invention are shown. It should be understood, however, that the present invention may be implemented in many different ways, and is not limited to the example embodiments described below. In fact, the embodiments described hereinafter are intended to make a more complete disclosure of the present invention and to adequately explain the scope of the present invention to a person skilled in the art. The embodiments disclosed herein can be combined in various ways to provide many additional embodiments.

The wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

In the specification, when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being "directly on", "directly attached" to, "directly connected" to, "directly coupled" with or "directly contacting" another element, there are no intervening elements present. In the specification, references to a feature that is disposed "adjacent" another feature may have portions that overlap, overlie or underlie the adjacent feature.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The term "A or B" used through the specification refers to "A and B" and "A or B" rather than meaning that A and B are exclusive, unless otherwise specified.

The term "schematically" or "exemplary", as used herein, means "serving as an example, instance, or illustration", rather than as a "model" that would be exactly duplicated. Any implementation described herein as exemplary is not necessarily to be construed as preferred or advantageous over other implementations.

Herein, the term "substantially", is intended to encompass any slight variations due to design or manufacturing imperfections, device or component tolerances, environmental effects and/or other factors.

In this context, the term "at least a portion" may be a portion of any proportion, for example, may be greater than 10%, 20%, 30%, 40%, 50%, 60%, 70%, 80%, 90%, or even 100%.

In addition, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise/include", as used herein, specify the presence of stated features, steps, operations, elements, and/or components, but do not preclude the presence or addition of one or more other features, steps, operations, elements, components, and/or groups thereof.

Embodiments of the present invention will now be described in more detail with reference to the accompanying drawings.

FIG. 1 is a schematic top view of a communication assembly according to some embodiments of the present invention. As shown in FIG. 1, the communication assembly includes a base station antenna and an integrated RRU. The base station antenna 100 may be mounted on a raised structure, such as an antenna tower or the like, with its longitudinal axis extending substantially perpendicular to the ground for convenient operation. The base station antenna 100 includes a radome 110 that provides environmental protection and a reflector 120. The reflector 120 may include a metal surface that provides a ground plane and reflects electromagnetic waves reaching it, for example, the metal surface redirects the electromagnetic waves for forward propagation. The base station antenna 100 further includes a feed board 130 disposed on a front side of the reflector 120. An antenna array 140 and its feeding circuits may be integrated on the feed board 130 in some embodiments. In other embodiments, a plurality of feed boards 130 may be provided and subsets of radiating elements of the antenna array 140 are mounted on the respective feed boards 130. The base station antenna 100 further includes mechanical and electronic components, such as a connector, a cable, a phase shifter, a remote electronic tilt (RET) unit, a duplexer, a calibration device 200, a filter 160 and the like, which may be disposed on a rear side of the reflector 120. In addition, a remote radio unit (RRU) 300 may be integrated outside the base station antenna 100, for example, installed on the rear side of the base station antenna 100.

In some types of the base station antennas 100, such as beamforming antennas, due to uncontrollable errors in the design, manufacture or use of RF control systems (such as the RRU 300) or the antenna feed networks, a calibration device 200 is typically required to compensate for the phase offsets and/or amplitude offsets of the RF signals that are input at different RF ports. This process is often referred to as "calibration."

The calibration device 200 may be configured as a printed circuit board that may be separate from the feed board 130. Typically, with the structural strength taken into account, the calibration device 200 needs to be mounted on a baseplate 170, which may be a plate in any suitable form, such as a metal plate. For the purpose of calibration, the calibration device 200 and the RRU 300 may bi-directionally transmit RF signals by, for example, a known coaxial connection device 180, which may be a coaxial connector or a coaxial cable.

A calibration device may include a dielectric substrate, a microstrip calibration circuit disposed on a first major surface of the dielectric substrate, and a ground metal layer disposed on a second major surface of the dielectric substrate. However, as more and more frequency bands and/or RF ports are integrated in the base station antenna, for example, from 8×8 MIMO (8R8T) to 64×64 MIMO (64R64T), the calibration device 200 becomes more sensitive to external interference signals, which may be noise signals coming from surrounding environments, and may also be RF signals reflected back from metal components near or within the base station antenna 100. As the calibration device 200 is disposed adjacent the RRU 300 which has a metal housing 310, the RF signal emitted from the calibration device 200 tend to be reflected by the metal housing 310 back to the calibration device 200. Such reflected signals can interfere with a calibration circuit 220 in the calibration device 200.

In order to improve the anti-interference performance of the calibration device, the calibration circuit of a conventional calibration device may be designed as a stripline network. For this purpose, the conventional calibration device may be implemented as a multi-layer printed circuit board including at least two dielectric substrates, wherein a first ground metal layer may be disposed on an upper surface of the upper dielectric substrate, a second ground metal layer may be disposed on a lower surface of the lower dielectric substrate, and the calibration circuit is provided in a metal layer between the two dielectric substrates. As a result, the calibration circuit is surrounded by the first and second ground metal layers, and may thus constitute a stripline network. The stripline network may be advantageous in that it can reduce losses of radiation signals and shield RF transmission lines from external radiation. However, the stripline network also has some disadvantages: First, it is complex to manufacture a stripline based calibration circuit. Second the cost is high. Third, it is difficult to tune the RF performance of the calibration circuit. Therefore, how to achieve high anti-interference performance of the antenna system at reasonable cost has been a technical problem urgently to be solved by those skilled in the art.

Figure 2:
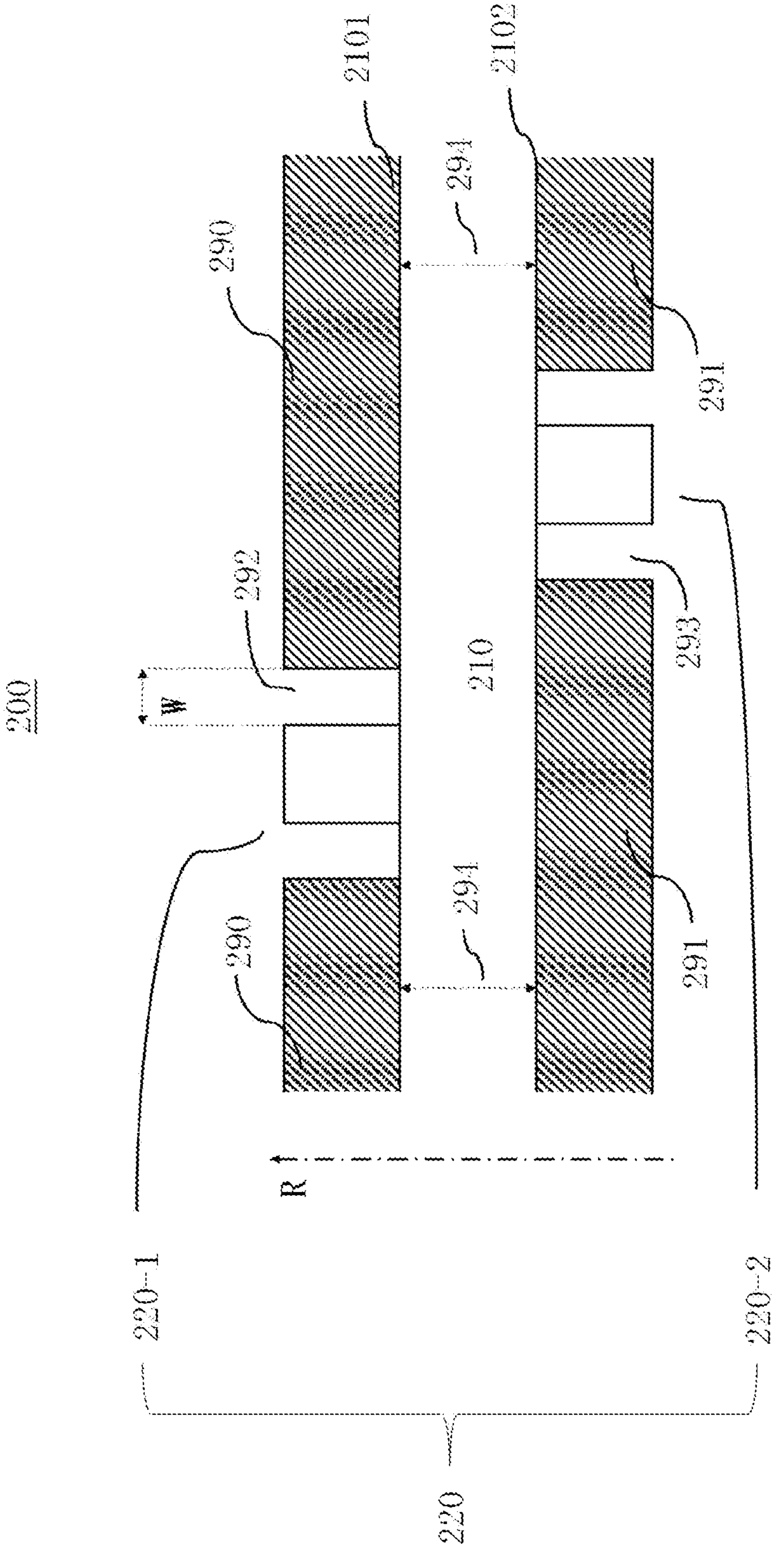
FIG. 2 is a schematic partial sectional view of a calibration device according to some embodiments of the present invention in the base station antenna of FIG. 1.
Figure 3:
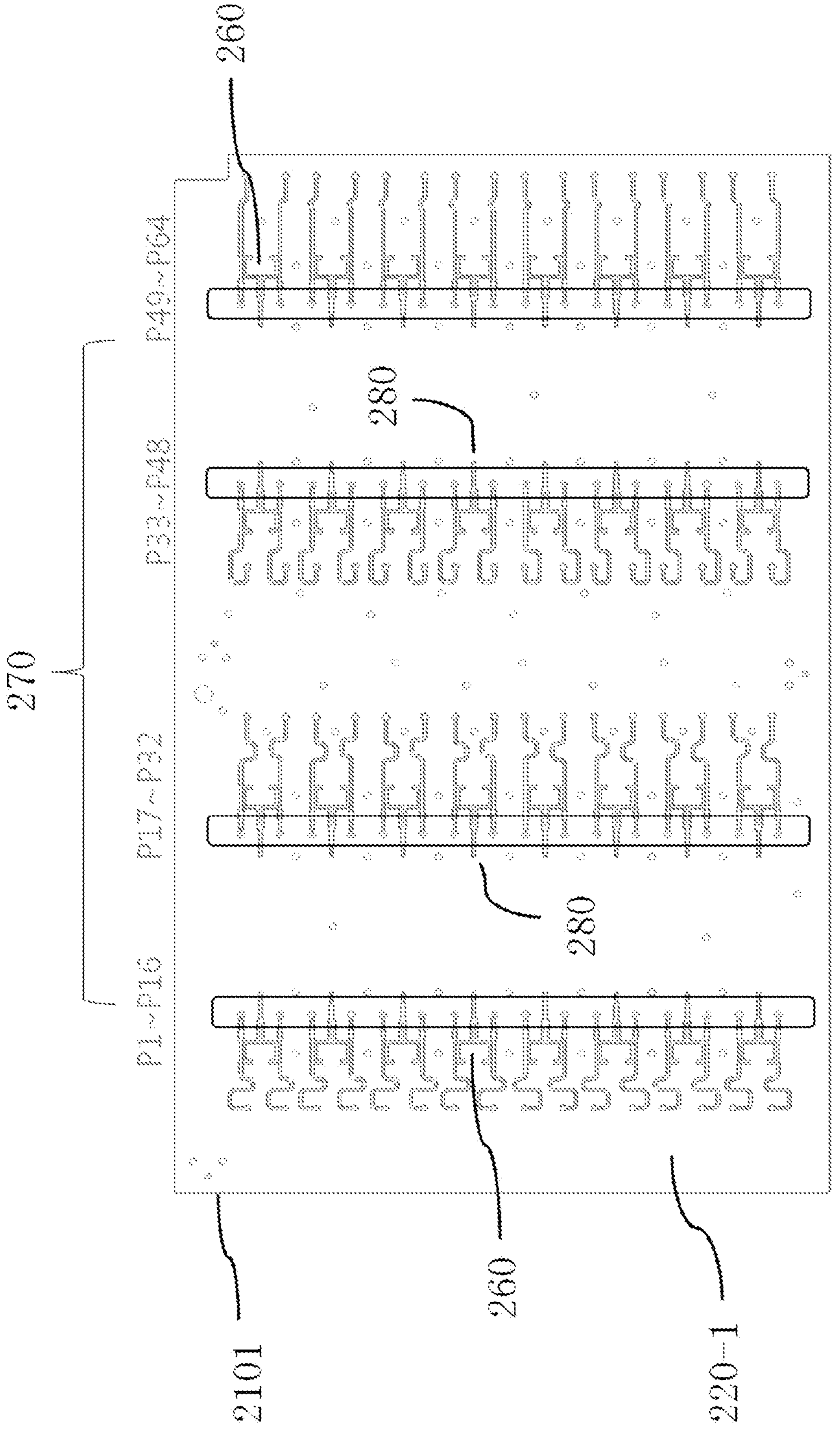
FIG. 3 is a simplified schematic view showing a first portion of a calibration circuit on the calibration device of FIG. 2.
Figure 4:
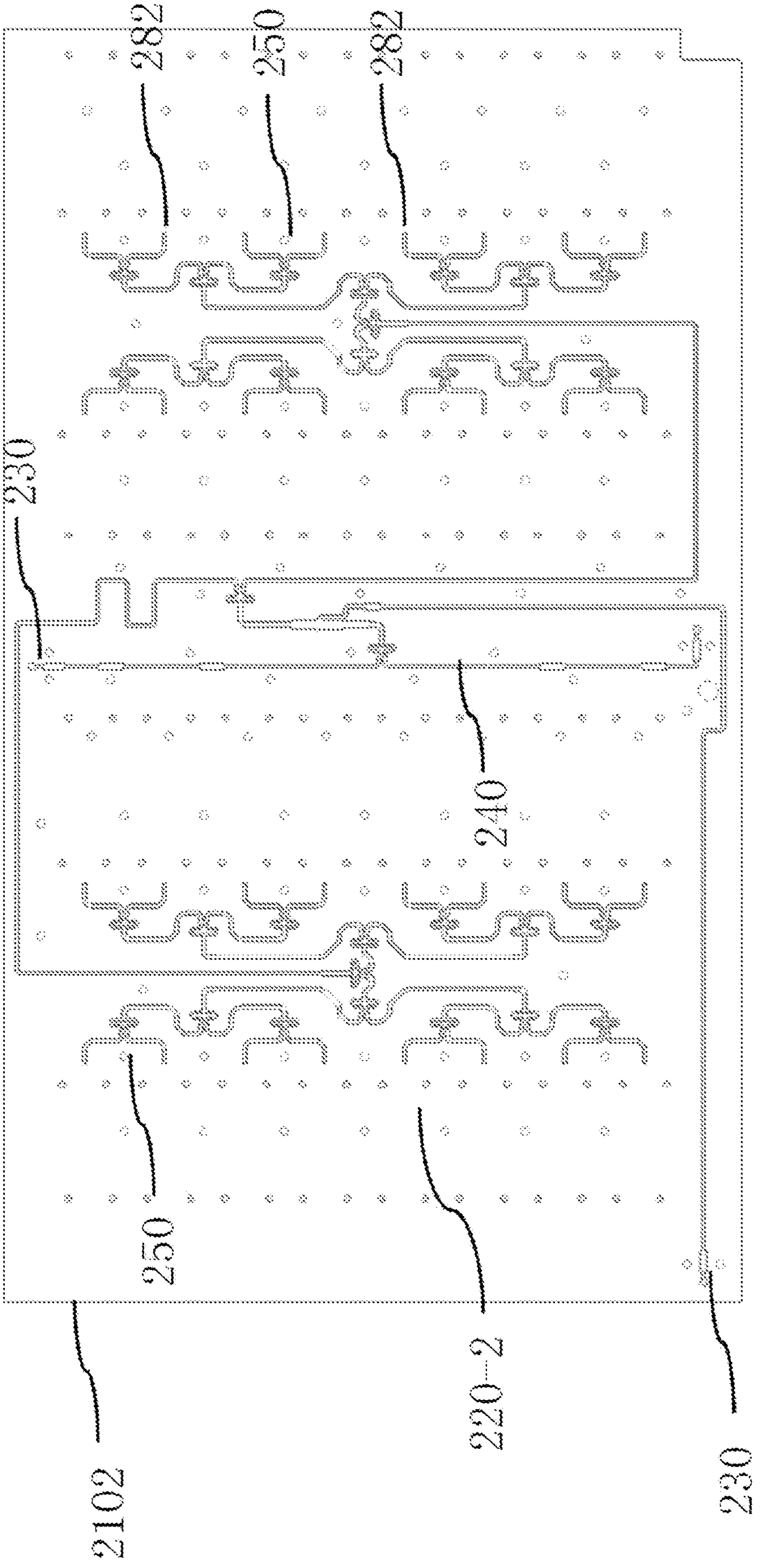
FIG. 4 is a simplified schematic view showing a second portion of the calibration circuit on the calibration device of FIG. 2.
Figure 5:
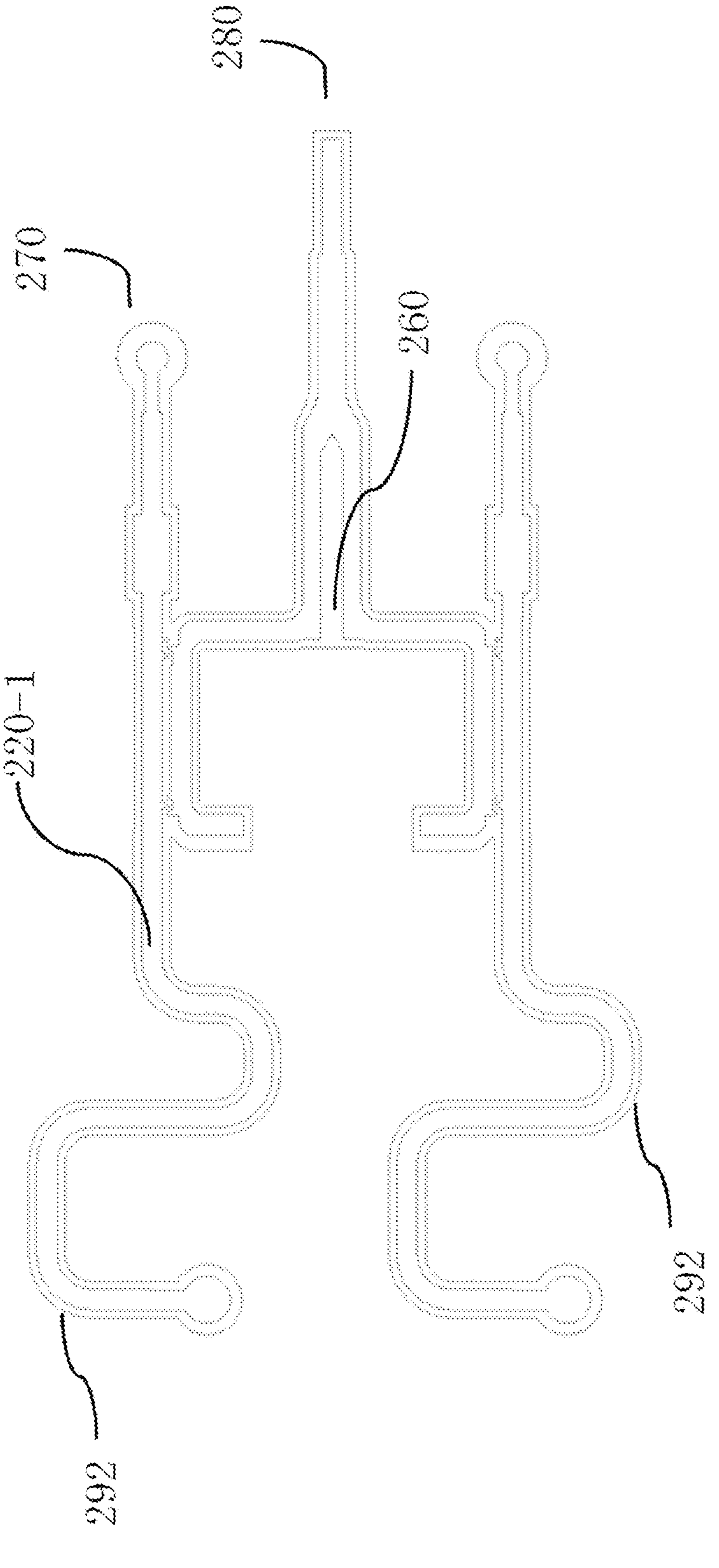
FIG. 5 is an enlarged partial schematic view showing the first portion of the calibration circuit in FIG. 3.
Figure 6:
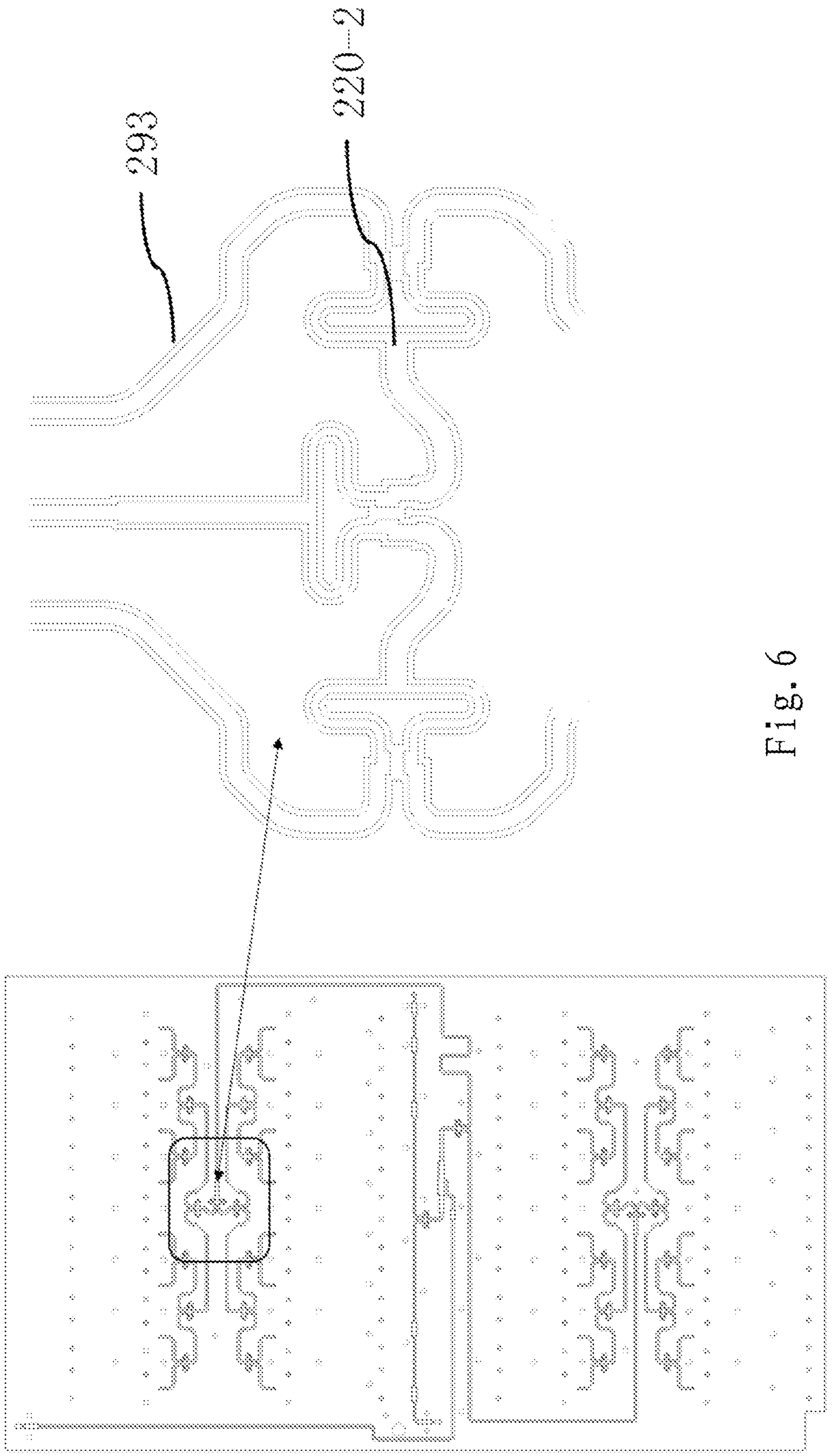
FIG. 6 is a partial schematic view showing the second portion of the calibration circuit in FIG. 4.

Next, the calibration device 200 according to some embodiments of the present invention will be described in more detail with reference to FIGS. 2 to 6, where FIG. 2 is a schematic partial sectional view of the calibration device 200 according to some embodiments of the present invention, FIG. 3 is a simplified schematic view showing a first portion 220-1 of the calibration circuit 220 on the calibration device 200, FIG. 4 is a simplified schematic view showing a second portion 220-2 of the calibration circuit 220 on the calibration device 200, FIG. 5 is an enlarged partial schematic view showing the first portion 220-1 of the calibration circuit 220, and FIG. 6 is a partial schematic view showing the second portion 220-2 of the calibration circuit 220.

Referring to FIG. 2, the calibration device 200 according to some embodiments of the present invention may be configured as one printed circuit board, such as a single-layer printed circuit board. In order to provide structural support, the calibration device 200 may be mounted on a baseplate 170 or a support plate (see FIG. 1). In the embodiment of FIG. 1, the baseplate 170 is advantageously disposed on the front side of the calibration device 200, so a majority of the pressing force caused by the RRU 300 may not be borne by the calibration device 200, but by the baseplate 170, whereby the structural safety of the calibration device 200 is guaranteed.

The calibration device 200 may include a dielectric substrate 210, and a metal pattern printed on the dielectric substrate 210. The metal pattern may include at least a portion of the calibration circuit 220. In some embodiments, the calibration device 200 may be configured as a single printed circuit board, and the printed circuit board may include an entirety of the calibration circuit 220. In other embodiments, the calibration device 200 may include two or more printed circuit boards, each of which may include a portion of the calibration circuit 220, and the individual portions of the calibration circuit may be in RF signal connection to each other using conductive connection devices, such as coaxial cables, coaxial connectors or electrical conductors.

The calibration circuit 220 may include a calibration port 230, transmission lines 240, power combiners 250 and couplers 260. The power combiners 250 may be configured as Wilkinson power combiners, and the couplers 260 may be configured as directional couplers. The calibration circuit 220 may be used to identify any unintended variations in the amplitude and/or phase of the RF signals that are input to the different RF ports 270 of the antenna 100.

Pursuant to some embodiments of the present invention, the calibration circuit 220 may be divided into at least two portions, wherein the first portion 220-1 of the calibration circuit 220 may be on the first major surface 2101 of the dielectric substrate 210, and the second portion 220-2 of the calibration circuit 220 may be on the second major surface 2102 of the dielectric substrate 210 opposite the first major surface 2101. The first major surface 2101 of the dielectric substrate 210 may face away from the RRU 300, whereas the second major surface 2102 of the dielectric substrate 210 may face the RRU 300. In this way, the first portion 220-1 of the calibration circuit 220 can be at least further away from the RRU 300, thereby reducing the interference of the RRU 300 to at least a portion of the calibration circuit 220. In addition, dividing the calibration circuit 220 into at least two portions can reduce the size of the calibration device 200 to thereby maintain the compact structure of the base station antenna 100.

In order to prevent the first portion 220-1 of the calibration circuit 220 from short-circuiting to the baseplate 170, a groove (not shown) may be provided in an area of the baseplate 170 corresponding to the first portion 220-1 of the calibration circuit 220, wherein the metal in the groove is removed to avoid direct electrical contact between the first portion 220-1 of the calibration circuit 220 and the baseplate 170. As there is only the need to provide a groove for a portion (i.e., the first portion 220-1) of the calibration circuit 220, the grooved area of the baseplate 170 is relatively limited, thereby ensuring high structural strength of the baseplate 170.

Referring to FIGS. 3 and 4, in some embodiments, the first portion 220-1 of the calibration circuit 220 may include the RF port 270 and the couplers 260. The second portion 220-2 of the calibration circuit 220 may include the calibration port 230 and the power combiner 250. An output end 280 of each coupler 260 may be electrically connected with an input end 282 of a power combiner 250 by means of a first conductive structure (not shown), such as vias or metal conductors. The design of the calibration circuit 220 according to FIGS. 3 and 4 is advantageous in that: Firstly, the RF ports 270 and the couplers 260 can be disposed away from the RRU 300: as the couplers 260 are relatively sensitive to radiant energy and near-field coupling, arranging of the RF ports 270 and the couplers 260 on a side facing away from the RRU 300 can reduce interference of the RRU 300 to the calibration circuit 220. Secondly, the first portion 220-1 of the calibration circuit 220 occupies only a part of the entire calibration circuit 220, so the grooved area on the baseplate 170 is relatively limited.

Pursuant to some embodiments of the present invention, in order to further reduce the interference of external interference signals to the calibration circuit 220, the calibration circuit 220 may be configured as a coplanar waveguide transmission line. Referring to FIGS. 2, 5 and 6, coplanar ground areas (hereinafter referred to as first coplanar ground areas 290) are printed on both sides of signal transmission lines of the first portion 220-1 of the calibration circuit 220, and coplanar ground areas (hereinafter referred to as second coplanar ground areas 291) are printed on both sides of signal transmission lines of the second portion 220-2 of the calibration circuit 220. The first coplanar ground areas 290 may be spaced apart from the first portion 220-1 of the calibration circuit 220 by a first slot 292, in which metalization is removed, and the first slot 292 may have a width W of any suitable size, for example, from 0.1 mm to 1 mm or from 0.2 mm to 0.5 mm. The second coplanar ground areas 291 may be spaced apart from the second portion 220-2 of the calibration circuit 220 by a second slot 293, in which metallization is removed, and the second slot 293 may have a width the same as or similar to that of the first slot 292. That is to say, the metal patterns on dielectric substrate may comprise coplanar ground areas surrounding the first portion 220-1 of the calibration circuit 220 and the second portion 220-2 of the calibration circuit 220 respectively.

The coplanar waveguide transmission lines include coplanar waveguide transmission lines without back metallization, and coplanar waveguide transmission lines with back metallization. In the embodiment of FIG. 2, the calibration circuit 220 may be at least partially configured as a coplanar waveguide transmission line with back metallization. Referring to FIG. 2, in a direction perpendicular to the first major surface 2101 of the dielectric substrate 210 (indicated by arrow R), the first portion 220-1 of the calibration circuit 220 and at least a portion of the first coplanar ground area 290 may be directly above at least a portion of the second coplanar ground area 291, and the second portion 220-2 of the calibration circuit 220 and at least a portion of the second coplanar ground area 291 may be directly below at least a portion of the first coplanar ground area 290. The first coplanar ground area 290 may be electrically connected to the second coplanar ground area 291 by means of a second conductive structure 294, such as a via or a metal conductor. Such coplanar waveguide transmission lines with back metallization are beneficial to further shield the calibration circuit 220 from external signals to improve the robustness and reliability of the calibration circuit 220.

In some embodiments, the RRU 300 may first input RF signals into the respective RF ports 270. Then, the calibration circuit 220 may extract, by means of the couplers 260, a small amount of each of the RF signals from the respective RF ports 270, and then combine these extracted signals to a calibration signal by means of the power combiners 250 and pass the calibration signal back to the RRU. The RRU 300 may adjust the amplitude and/or phase of the RF signals to be input to the RF ports 270 according to the calibration signal so as to provide an optimized antenna 100 beam.

It should be understood that the calibration device 200 and the calibration circuit 220 may include other suitable structural forms and/or operating modes, and are not limited to the embodiments described above.

In other embodiments, the first portion 220-1 of the calibration circuit 220 may further include, in addition to the RF port 270 and the coupler 260, other RF elements such as a matching impedance, a power combiner 250, or the like. The second portion 220-2 of the calibration circuit 220 may further include, in addition to the calibration port 230 and the power combiner 250, a matching impedance or the like.

In other embodiments, the calibration process may be performed in a reversed manner, and the power combiner 250 functions as a power divider at this time. In this case, the RRU 300 may first input a calibration signal to the calibration port 230. Then, the calibration signal is passed from the calibration port 230 via the respective transmission lines 240 to the power dividers which divide the calibration signal into a plurality of sub-components. The sub-components of the calibration signal are passed by the respective couplers 260 to the respective feed branches. The RF ports 270 may each extract a small portion of the calibration signal by means of the couplers 260. The RRU 300 may read the amplitude and/or phase of the RF signals that are electrically coupled from the calibration circuit 220 via the couplers 260 to the RF ports 270. Thus, the RRU may accordingly adjust the amplitude and/or phase of the RF signal to be input to the RF port 270 so as to provide an optimized antenna 100 beam.

Although exemplary embodiments of the present invention have been described, those skilled in the art should appreciate that many variations and modifications are possible in the exemplary embodiments without materially departing from the spirit and scope of the present invention. Accordingly, all such variations and modifications are intended to be included within the scope of the present invention.

That which is claimed is:

1. A calibration device for an antenna, comprising:

a dielectric substrate; and a metal pattern printed on the dielectric substrate, wherein the metal pattern includes at least a portion of a calibration circuit, wherein the first portion of the calibration circuit is on a first major surface of the dielectric substrate, a second portion of the calibration circuit is on a second major surface of the dielectric substrate that is opposite the first major surface, and at least one of the first portion and the second portion of the calibration circuit is constructed as a coplanar waveguide transmission line.

2. The calibration device according to claim 1, wherein the first portion of the calibration circuit includes a radio frequency ("RF") port and/or a coupler.

3. The calibration device according to claim 1, wherein the second portion of the calibration circuit includes a calibration port and/or a power combiner.

4. The calibration device according to claim 1, wherein the first portion of the calibration circuit comprises a plurality of first conductive traces and the second portion of the calibration circuit comprises a plurality of second conductive traces, and the metal pattern further includes a first coplanar ground area printed on both sides of at least some of the first conductive traces and a second coplanar ground area printed on both sides of at least some of the second conductive traces.

5. The calibration device according to claim 4, wherein the first coplanar ground area is spaced apart from the first conductive traces by a first slot, in which metallization is removed, and the second coplanar ground area is spaced apart from the second conductive traces by a second slot, in which metallization is removed.

6. The calibration device according to claim 5, wherein the first slot has a width between 0.1 mm and 1 mm, and the second slot has a width between 0.1 mm and 1 mm.

7. The calibration device according to claim 4, wherein, with reference to a direction perpendicular to the first major surface of the dielectric substrate, the first portion of the calibration circuit is directly above at least a portion of the second coplanar ground area, and/or the second portion of the calibration circuit is directly below at least a portion of the first coplanar ground area.

8. The calibration device according to claim 4, wherein the at least one of the first portion and the second portion of the calibration circuit is at least partially configured as coplanar waveguide transmission lines with back metallization.

9. The calibration device according to claim 4, wherein the first coplanar ground area is electrically connected to the second coplanar ground area by a second conductive structure.

10. The calibration device according to claim 1, wherein the first portion of the calibration circuit is electrically connected to the second portion of the calibration circuit by a first conductive structure.

11. A base station antenna, comprising:

a reflector, an antenna array on the front side of the reflector;

a calibration device; and a baseplate, wherein the calibration device and the baseplate are provided on the rear side of the reflector, and the calibration device is mounted on the baseplate, wherein the calibration device includes a dielectric substrate and a metal pattern printed on the dielectric substrate, wherein the metal pattern includes at least a portion of a calibration circuit, and wherein a first portion of the calibration circuit is on a first major surface of the dielectric substrate and a second portion of the calibration circuit is on a second major surface of the dielectric substrate opposite the first major surface, and the first portion of the calibration circuit includes a radio frequency ("RF") port and a coupler.

12. The base station antenna according to claim 11, wherein the second portion of the calibration circuit includes a calibration port and/or a power combiner.

13. The base station antenna according to claim 12, wherein the first portion of the calibration circuit is electrically connected to the second portion of the calibration circuit by a first conductive structure.

14. The base station antenna according to claim 13, wherein an output end of the coupler in the first portion of the calibration circuit is electrically connected with an input end of the power combiner in the second portion of the calibration circuit by the first conductive structure.

15. The base station antenna according to claim 11, wherein the baseplate includes a groove, in which metal is removed, and wherein the first portion of the calibration circuit overlaps the groove to avoid direct electrical contact between the first portion of the calibration circuit and the baseplate.

16. The base station antenna according to claim 11, wherein the first portion and the second portion of the calibration circuit are configured as coplanar waveguide transmission lines.

17. The base station antenna according to claim 16, wherein the first portion of the calibration circuit comprises a plurality of first conductive traces and the second portion of the calibration circuit comprises a plurality of second conductive traces, and the metal pattern further includes a first coplanar ground area printed on both sides of at least some of the first conductive traces, and a second coplanar ground area printed on both sides of at least some of the second conductive traces.

18. The base station antenna according to claim 17, wherein the first coplanar ground area is spaced apart from the first conductive traces by a first slot, in which metallization is removed, and the second coplanar ground area is spaced apart from the second conductive traces by a second slot, in which metallization is removed.

19. The base station antenna according to claim 11, wherein the calibration device is configured as a single-layer printed circuit board including only one dielectric substrate between the first portion and the second portion of the calibration circuit.

* * * * *